United States Patent
Park et al.

(10) Patent No.: US 7,319,912 B2
(45) Date of Patent: Jan. 15, 2008

(54) MANAGEMENT SYSTEM FOR SEMICONDUCTOR MANUFACTURING EQUIPMENT

(75) Inventors: Jin-Woo Park, Hwaseong-si (KR); Hong-Jin Park, Yongin-si (KR); Hyoung-Min Park, Seoul (KR); Young-Hak Hwang, Seongnam-si (KR); Yong-Bum Park, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/431,028

(22) Filed: May 10, 2006

(65) Prior Publication Data
US 2007/0090953 A1 Apr. 26, 2007

(30) Foreign Application Priority Data
Oct. 24, 2005 (KR) .................. 10-2005-0100156

(51) Int. Cl.
G06F 17/00 (2006.01)
G08B 13/14 (2006.01)
G08B 5/22 (2006.01)

(52) U.S. Cl. .............. 700/116; 700/115; 700/121; 700/215; 700/228; 700/229; 340/572.1; 340/825.49

(58) Field of Classification Search ............ 700/108, 700/111, 112, 113, 115, 116, 213, 215, 222, 700/228, 229, 121; 340/572.1, 572.4, 825.49; 235/375, 385
See application file for complete search history.

(56) References Cited

U.S. PATENT DOCUMENTS

| | | | |
|---|---|---|---|
| 6,192,291 B1 * | 2/2001 | Kwon | 700/121 |
| 6,351,684 B1 * | 2/2002 | Shirley et al. | 700/121 |
| 6,473,664 B1 * | 10/2002 | Lee et al. | 700/110 |
| 6,480,756 B1 | 11/2002 | Luh et al. | |
| 6,584,371 B1 | 6/2003 | Sada et al. | |
| 6,591,162 B1 * | 7/2003 | Martin | 700/228 |
| 6,662,066 B1 | 12/2003 | Yu et al. | |
| 6,928,333 B1 * | 8/2005 | Conboy et al. | 700/112 |
| 7,142,120 B2 * | 11/2006 | Charych et al. | 340/572.4 |
| 7,158,850 B2 * | 1/2007 | Cheng et al. | 700/115 |
| 7,162,326 B1 * | 1/2007 | Shirley et al. | 700/115 |
| 7,183,925 B2 * | 2/2007 | Marshall et al. | 340/572.4 |
| 2004/0049398 A1 * | 3/2004 | Gartland et al. | 700/112 |
| 2005/0143853 A1 * | 6/2005 | Akimori et al. | 700/121 |

OTHER PUBLICATIONS

"ZigBee Alliance—Markets & Solutions", ZigBee Alliance, http://www.zigbee.org/en/markets/index.asp.*

* cited by examiner

*Primary Examiner*—Kidest Bahta
*Assistant Examiner*—Charles Kasenge
(74) *Attorney, Agent, or Firm*—Volentine & Whitt, PLLC

(57) ABSTRACT

A management system for semiconductor manufacturing equipment in a manufacturing facility is provided. The system includes a host computer communicating with a tracking server, the tracking server communicating with a wireless network adapted to communicate with a radio tag associated with a wafer cassette. The tracking server is adapted to receive status information from the radio tag via the wireless network, to derive location or movement information for the wafer cassette from the status information, and to determining an optimal transfer path for the wafer cassette through the manufacturing facility.

18 Claims, 7 Drawing Sheets

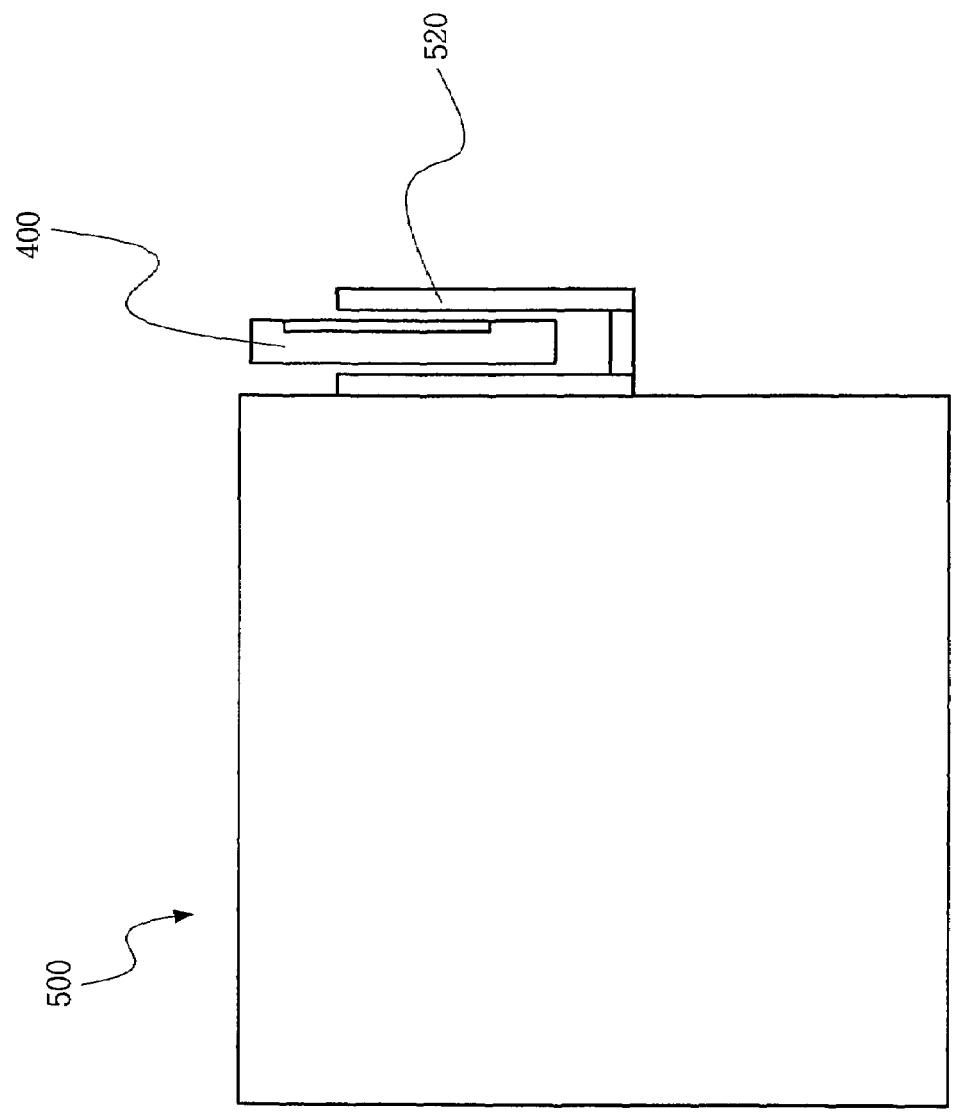

MANAGEMENT SYSTEM FOR SEMICONDUCTOR MANUFACTURING EQUIPMENT

BACKGROUND OF THE INVENTION

1. Technical Field

Embodiments of the invention relate to a management system for semiconductor manufacturing equipment. More particularly, embodiments of the invention relate to a management system for semiconductor manufacturing equipment capable of real-time monitoring the transfer of wafers between various pieces of semiconductor manufacturing equipment.

This application claims priority to Korean Patent Application No. 10-2005-0100156 filed Oct. 24, 2005, the subject matter of which is hereby incorporated by reference in its entirety.

2. Discussion of Related Art

The manufacture of semiconductor devices on silicon wafers generally involves a complex sequence of fabrication processes. Specific fabrication processes include, for example, deposition processes adapted to form material layers on a semiconductor substrate, photolithography and etching processes adapted to pattern the material layers, implantation processes adapted to selectively implant impurity ions, and various heat treatment processes.

Many of these fabrication processes are performed, in whole or in part, by highly automated systems that make use of custom processing equipment (e.g., process chambers) and work stations. All or much of the manufacturing process is typically accomplished in a large production facility. Accordingly, the physical transfer (e.g., process flow, holding and storage, etc.) of the silicon wafers through the production facility—in order to receive application of the proper sequence of processes—is a very complex engineering endeavor. It requires careful design and layout of the production facility and careful use of management tools. Indeed, the inevitable breakdown or maintenance down-time associated with a single piece of fabrication equipment may result in lengthy production lags for numerous wafers, unless the breakdown is quickly identified and remedied.

However, the largely automated nature of the production facility's equipment and the vast area occupied by this equipment in huge factory facilities make it difficult to effectively monitor the progress of various silicon wafers through the manufacturing process. As a result, numerous human operators are routinely hired to monitor and maintain the fabrication equipment in order to minimize production interruptions.

This large scale human interaction is often accomplished in relation to "lots" of silicon wafers. A wafer lot is a collection of wafers held in a single carrying apparatus referred to as a "wafer cassette." Each wafer cassette holds a plurality of wafers intended to receive the same sequence of fabrication processes. Each wafer lot is associated with a barcode attached to the wafer cassette.

As a wafer cassette moves through the manufacturing process, its barcode is read by barcode readers associated with respective pieces of semiconductor manufacturing equipment. For example, the barcode for a wafer lot is read when the wafer cassette is loaded onto a piece of semiconductor manufacturing equipment. An indication is then made in a record or control process associated with the barcode that the constituent process performed by the equipment has been applied to the wafers in the lot.

A controller and/or a host computer may be used to accumulate processing information for various wafer lots as they pass through the manufacturing facility. If information regarding the processing state of a wafer lot is required, a human operator may query the host computer from a networked workstation (e.g., a Personal Computer).

This type of management approach allows data visibility down to the wafer lot level and the wafer cassette level. That is, the wafer lot in the conventional management system forms the basic unit of data granularity, as a cassette is transferred between numerous pieces of semiconductor manufacturing equipment.

However, this type of wafer management system suffers from several problems. For example, the process contains both automated and non-automated (e.g., human controlled) process steps. Thus, centralized optimization of the overall process is impossible as no control, and little visibility is possible over the non-automated process steps. As a result, the transfer efficiency and speed for wafer cassettes between different pieces of semiconductor manufacturing equipment are impossible to optimize.

Additionally, while the arrival and departure of cassettes may be tracked in point by point fashion, the conventional system offers no real-time mechanism for tracking actual movement (or lack of movement) by cassettes through the manufacturing process. Hence, production bottlenecks may not be identified in real-time.

Additionally, information regarding a particular cassette may only be determined when an operator reads out the information at a test station using (e.g.) a barcode reader. This approach can require a great deal of time and precludes a real-time understanding of a particular wafer's processing status. All of these problems adversely effect productivity.

SUMMARY OF THE INVENTION

Embodiments of the invention provide a management system for semiconductor manufacturing equipment capable of enhancing transfer efficiency and speed for wafer cassettes throughout a manufacturing process. Embodiments of the invention also allow definitive location and status information to be obtained in real-time, thereby optimizing wafer movement throughout the manufacturing process. These improvements increase overall productivity.

Thus, in one embodiment, the invention provides a management system for semiconductor manufacturing equipment in a manufacturing facility, the system comprising; a host computer communicating with a tracking server, the tracking server communicating with a wireless network adapted to communicate with a radio tag associated with a wafer cassette, wherein the tracking server is adapted to receive status information from the radio tag via the wireless network, to derive location or movement information for the wafer cassette from the status information, and to determining an optimal transfer path for the wafer cassette through the manufacturing facility.

In a related aspect, the wireless network and the radio tag are compatible with a ZigBee wireless communication system comprising a ZigBee coordinator connected to the tracking server, and a plurality of ZigBee routers wirelessly to the ZigBee coordinator and wirelessly communicating with the radio tag.

BRIEF DESCRIPTION OF THE DRAWINGS

Several embodiments of the invention are described with reference to the accompanying drawings in which:

FIG. 7 is a side sectional view showing a wafer cassette on which a ZigBee radio tag of FIG. 6 is mounted.

DESCRIPTION OF EXEMPLARY EMBODIMENTS

The present invention will now be described in the context with several embodiments. However, the invention should not be construed as limited to only the illustrated embodiments set forth herein. Rather, these embodiments are presented as teaching examples.

Figure 1:
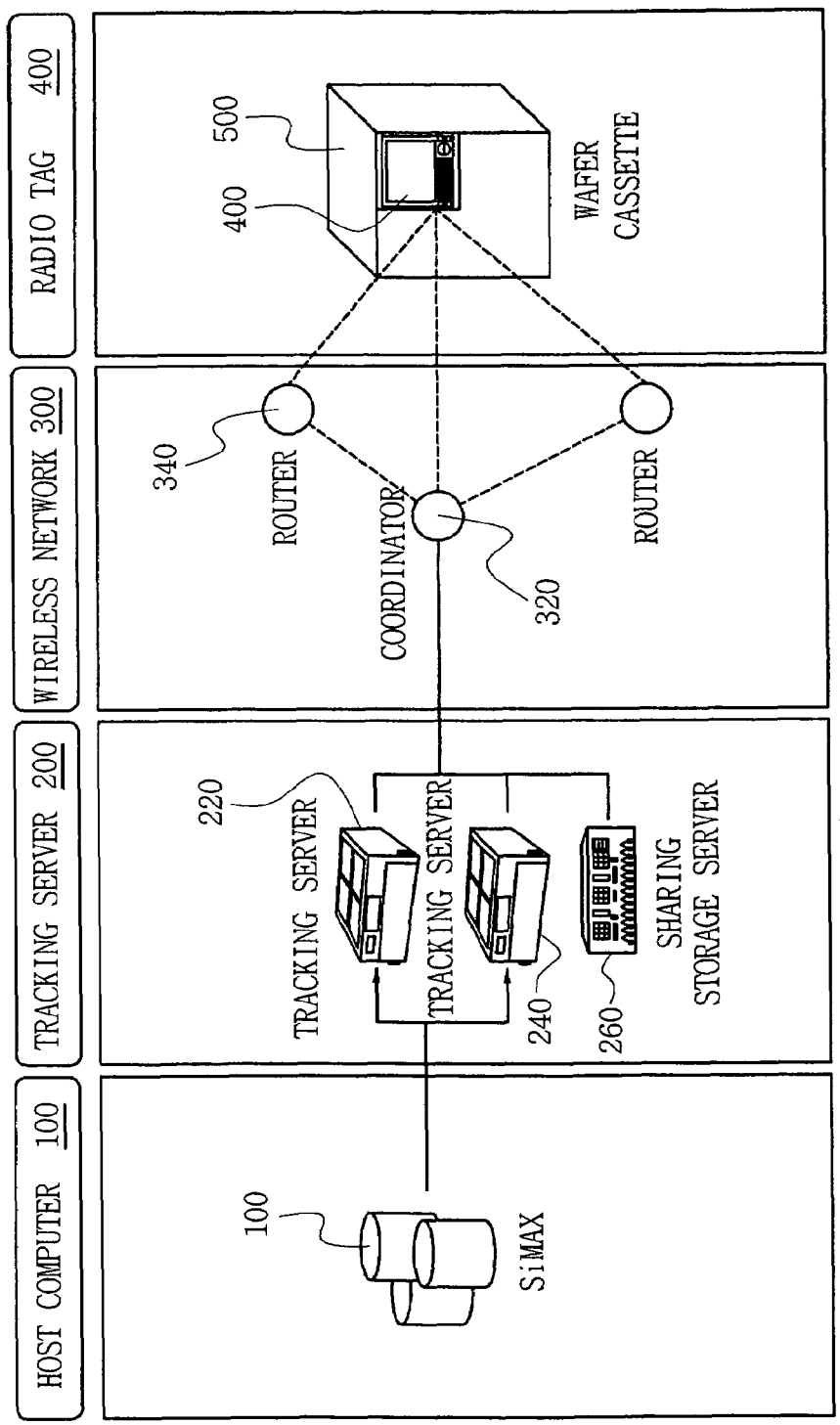
FIG. 1 schematically illustrates a management system for semiconductor manufacturing equipment according to an embodiment of the present invention.

FIG. 1 shows an exemplary management system for semiconductor manufacturing equipment comprising a host computer 100 adapted to control a manufacturing process for semiconductor devices formed on silicon wafers. The exemplary management system also comprises a tracking server 200 adapted to recognize and estimate the status of a wafer cassette through the manufacturing process in response to a data signal received from host computer 100. In accordance with this status estimation, tracking server 200 is further adapted to determine an optimal transfer path for the cassette, and transmit this information to host computer 100.

The illustrated embodiment of the management system contemplates the use of a radio tag 400 mounted on a wafer cassette 500. Tracking server 200 recognizes the status of wafer cassette 500 by obtaining information contained or associated with radio tag 400 via a wireless network 300. "Status" information may include, for example, the location of a particular radio tag 400, etc.

In one embodiment, host computer 100 may take the form of a general-purpose computer competent to assume the central processing and control operations of a fairly complex information processing system. In one specific embodiment, host computer 100 comprises a "SiMAX" super-computer.

In such an embodiment, the general-purpose computer system may be provided in a climate controlled, central computer room, and may be further adapted to handle data processing requests from all of the various departments associated with the semiconductor manufacturing facility. Host computer 100 should be equipped with a versatile operating system, such as a time-sharing multiprogramming system, as well as a communication control system in order to accommodate immediate data processing requests from multiple remote terminals.

Host computer 100 will also provide, or be associated with equipment adapted to provide auxiliary (or back-up) storage in order to centralization system data. For example, the auxiliary storage associated with host computer 100 may store data related to various fabrication processes (e.g., process sequences, specific recipes, etc.). Access to this global data allows host computer 100 to arrange use of the individual processes and related equipment in such a manner that overall production of semiconductor devices is optimized.

Host computer 100 may be further adapted to output signals controlling the various automatic or manual transfer aspects of the manufacturing facility. Such centralized control allows further optimization of the overall production process. For example, optimal transfer paths may be defined for various wafer cassettes and provided to tracking server 200. Transfer path information is used in conjunction with automatic transfer aspects of the fabrication facility (e.g., cassette handling robots) to efficiently move wafer cassettes around the facility under the direct control of host computer 100 or a separately provided microprocessor controlled system. Transfer path information is also used in conjunction with manual transfer aspects of the fabrication facility. For example, human operators may be provided with indications of transfer timing. Transfer path information and related wafer cassette movement feedback information administered by host computer 100 may also be used to provide status information in response to a query from an external operator.

Tracking server 200 may be provided as a sub-system operating on a conventional local area network (LAN). As the number and complexity of tracked components within a production facility increases, certain embodiments of the invention may benefit from a tracking server formed by multiple, linked servers. Where tracking server 200 comprises multiple linked servers, multiple parallel data processing channels may be defined using conventional packet control or related data partitioning techniques. For example, tracking server 200 may comprise a first tracking server 220 adapted to provide status information to host computer 100, and a second tracking server 240 adapted to communicate with radio tag 400 via wireless network 300.

The many data processing and data management requirements placed on tracking server 200 may be variously implemented across the constituent linked servers. For example, first tracking server 220 may be adapted to run a transfer optimization program that categorizes and evaluates status information in view of transfer path scheduling. First tracking server 220 may be further adapted to monitor and control elements of wireless network 300 and radio tag 400, as well as the facility's software resources (e.g., program updates, data program files, etc.) and hardware resources (e.g., display devices, modems, facsimiles, printers, etc.).

Additionally or alternatively, first tracking server 220 may execute and manage a map program adapted to provide a visual indication of the location of any and all wafer cassettes within the fabrication facility. The map program may take many different forms, but will generally indicate the position of a wafer cassette using position information (e.g., part of the status information for the wafer cassette) received via wireless network 300.

Second tracking server 240 may be adapted to maintain a database of status information (e.g., including current, historical, trend-related, etc.) for use by host computer 100. Database maintenance may be permanent or temporary with appropriate back-up mechanisms being put in place. Second tracking server 240 may be further adapted to retrieve in real-time status information for a particular wafer cassette in response to an operator query. Second tracking server 240 may be further associated with a sharing storage server 260 specifically adapted archive status information as well as data files generated by tracking server 200.

In one embodiment, tracking server 200 may take the form of a client/server system which provides service in response to requests from a client (e.g., a human operator, or external computer system). Tracking server 200 may therefore be provided with a suitable user interface, and may be adapted to run distributed data processing software enabling multiple user inquiries to establish a cooperative database environment.

In certain embodiments of the invention, tracking server 200 may take the form of a conventional, small-scale LAN supporting about 5 to 20 clients and appropriately sized to service any or all of the exemplary services. Alternatively, a large-scale LAN may be used where requirements dictate. The large-scale LAN may be formed from several linked servers having defined roles within the system (e.g., a file server, a communications server, etc.). Alternatively, tracking server 200 may comprise one or more internet servers.

In one embodiment, tracking server 200 is adapted to share and/or exchange data with the semiconductor equipment operating within the fabrication facility using a defined communications protocol such as the semi equipment communications standard (SECS) protocol. Further, tracking server 200 and host computer 100 may be adapted to communicate data using a Transmission Control Protocol (TCP), Internet Protocol (IP), and/or other standard communication protocols.

Wireless network 300 may be established throughout the fabrication facility using any one or more of several available conventional techniques, so long as tracking server 200 and/or host computer 100 may receive status information from radio tag 400 associated with wafer cassette 500. To this end, wireless network 300 may comprise wireless communications coordinator 320 (e.g., a computer terminal) hardwired connected to tracking server 200, and one or more routers 340 connected to coordinator 320 via a hardwired or wireless link. Routers 340 and/or coordinator 320 are adapted to wirelessly communicate with radio tag 400.

In one embodiment, router 340 may be formed from a device adapted to read the address and/or routing information contained (e.g.,) in a transmission data packet received from tracking server 200 or host computer 100. The address and routing information may be used to pass the data packet to router where doing so will improve the communications channel. Conventional IP enabled devices and related programming and operating techniques may be used to implement routers 340.

Multiple routers may be used to provide flexibly defined communications channels in order to efficiently distribute data (i.e., send and receive data) throughout the entire fabrication facility. Thus, a plurality of networked routers 340 may be strategically located throughout the fabrication facility to enable the location of and communication with any given radio tag 400. In this manner, a wafer cassette may be faithfully tracked and queried anywhere in the facility.

In various embodiments, wireless network 300 may be implemented using conventionally available hardware and software related to a ZigBee wireless communication system, a wireless LAN communication system, a Radio Frequency Identification (RFID) communication system, or a Bluetooth communication system, etc.

As an example of these implementation options, a particular embodiment will now be described in the context of a wireless network 300 based on the so-called ZigBee wireless communication system. This type of system as been shown to have excellent flexibility, expandability and compatibility characteristics, is lost cost, and requires only modest power consumption. As such, it is well suited to the requirements of the present invention. Thus, in one embodiment, wireless network 300 may comprise a ZigBee wireless communication system, including a ZigBee coordinator 320, at least one ZigBee router 340, and a ZigBee radio tag 400.

The ZigBee wireless communication system supports short range communication (e.g., 10 to 20 meters) and is compatible with IEEE 802.15.4 standards. The ZigBee wireless communication system supports a transmission rate of 20 to 50 kbps up to a maximum range of 100 meters using three frequency ranges, and ZigBee coordinator 320 may be interfaced with up to 255 computer terminals via a wireless network 300 running at 2.4 GHz. A network of 65,000 ZigBee routers 340 may be connected to ZigBee coordinator 320 via wireless or hardwired links. Each ZigBee router may communicate with one or more ZigBee radio tags 400 via respective wireless links.

However, as an alternative to a ZigBee wireless communication system, other embodiments of the invention may make use of a generic wireless LAN communication system, or Wi-Fi system. The wireless LAN system may be implemented using a high-speed Internet link connected to a PDA (Personal Digital Assistant) or notebook computer. Because the wireless LAN makes use of a broadcast radio frequency signals, neither a telephone line nor some other dedicated hard line is required. Rather, a commercially available wireless LAN card may be installed on the PDA or notebook computer. In one embodiment, a wireless LAN compatible with IEEE 802.11b standards may be used. However, where wireless network 300 is implemented using a commercially available Wi-Fi system potential security, communication link, and interference problems should be carefully evaluated with respect to the fabrication facility. Bluetooth based systems may be similarly considered.

As yet another alternative, commercially available RFID technology may be used to implement wireless system 300. RFID is conveniently provided through the use of components (e.g., a reader and a passive or active ID tag) enabling a non-contact recognition system. Available RFID systems include low-frequency (30-500 KHz) and high-frequency (850-950 MHz as well as 2.4-5.8 GHz) systems. Low-frequency systems may be used at short range (e.g., 1.8 meters or less), while high-frequency systems may be used at longer ranges (e.g., up to 27 meters or more). These range limitations and other problems associated with RFID signal links should be carefully evaluated before using RFID to implement wireless network 300.

Table 1 shows comparison results for a ZigBee wireless communication system, a generic wireless LAN system, and an RFID system in a model operating environment.

TABLE 1

|  | Wireless LAN | RFID | ZigBee |
| --- | --- | --- | --- |
| Frequency | 2.4 GHz, 5.8 GHZ | 3.56 MHz to 2.4 GHz | 866 MHz/915 MHz/ 2.4 GHz |
| Radio wave property | Travel through one wall | Excellent diffraction property | Travel through one wall |
| Wireless network structure | Star | Star | Mesh/Tree/Star |
| End point No. | 10-20 | 1 | 65536 |
| Active current | 200 mA | 50 mA | 35 mA |
| Inactive current | 10 mA | 50 μA | 20 μA |
| Average current | 50 mA | 10 mA | 0.5 mA |
| Power profile | Several hours | Several days | Several months |

Here, the ZigBee wireless communication system, wireless LAN communication system, and RFID communication system make use of a communication frequency ranging from several MHz to several GHz. Since the wireless LAN communication system uses the frequency of a high-frequency range of 2.4 GHz to 5.8 GHz, it is normally possible to propagate a communication signal through a model facility wall. In contrast, the RFID communication, operating at a frequency ranging from 3.56 MHz to 5.8 GHz, makes good use of excellent diffraction properties to avoid signal blocking obstacles.

Figure 2:
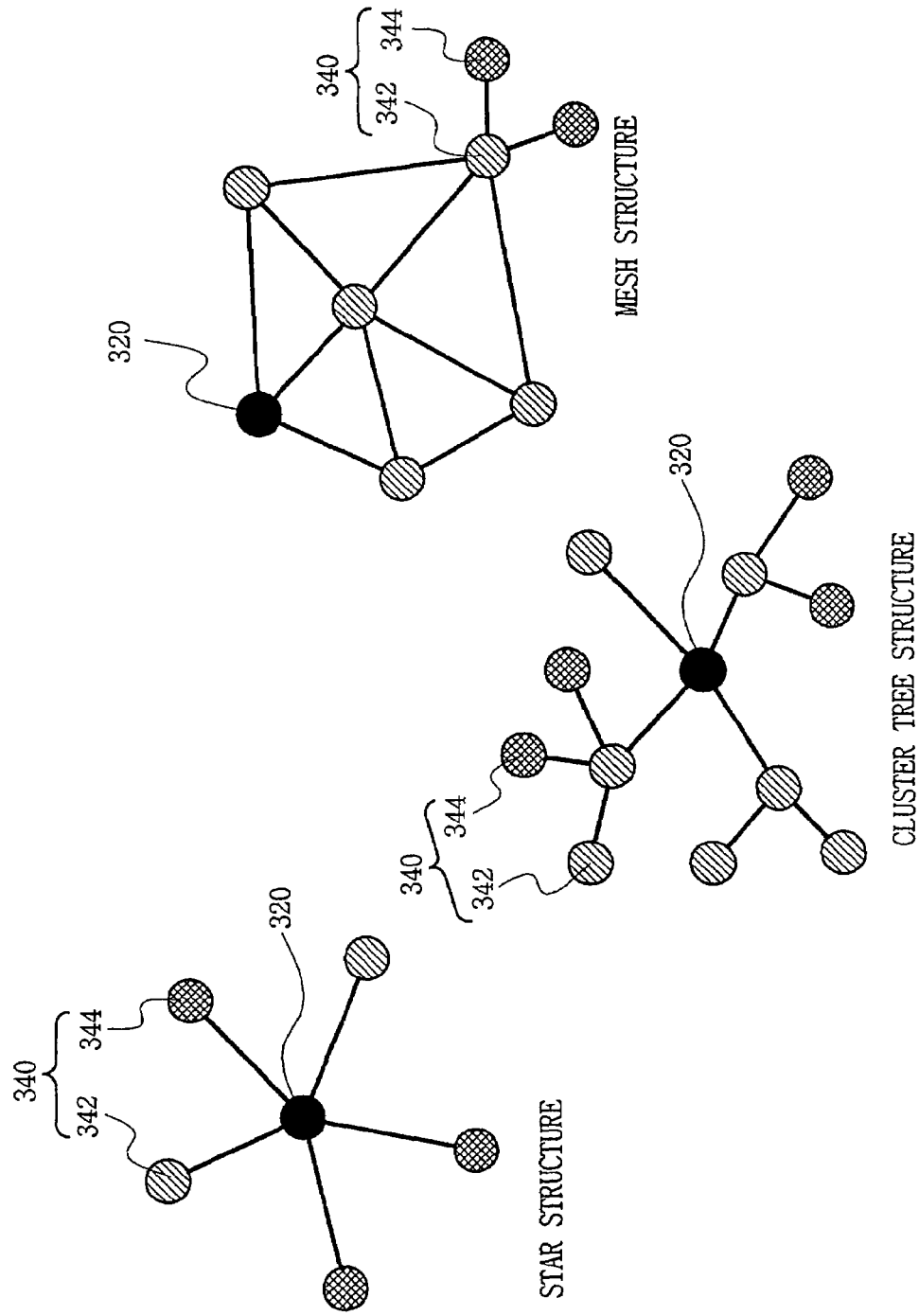
FIG. 2 shows a wireless network structure employing a ZigBee wireless communication system.

The ZigBee wireless communication system, operating at a frequency of 866 MHz (or 915 MHz) and 2.4 GHz, is also able to propagate a signal through the model wall. Because the ZigBee wireless communication system is adapted to the inclusion of many nodes capable of detecting and communicating with radio tags 400 associated with wafer cassettes 500, its has excellent expandability properties, and more potential end points than the RFID communication system. For example, as shown in FIG. 2, the ZigBee wireless communication system may be designed to have a star structure where a plurality of ZigBee routers 340 extend from at least one ZigBee coordinator 320, a cluster-tree structure where a plurality of ZigBee routers 340 extend from a ZigBee coordinator 320 or another ZigBee router (e.g. router combination 340 comprising routers 342 and 344), and a mesh structure where a plurality of commonly connected ZigBee routers 340 extend from at least one ZigBee coordinator 320.

In one embodiment, the mesh structure is well contemplated for use within a fabrication facility as it provides excellent coverage and multiple, efficiently defined communication channels. Within this context it should be noted that ZigBee routers 340 may be implemented in one of two types: a full function router 342 adapted to communicate with (e.g., detect status information from) a radio tag 400, as well as act as a repeater in order to implement multiple communication channel paths to cover all remote locations within the fabrication facility, and a reduced function router 344 adapted only to communicate with radio tag 400.

Within a mesh (or other competent) structure, each ZigBee router 340 may be used to generate a time stamp in relation to a passing or proximate ZigBee radio tag 400 and communicate the time stamp to tracking server 200 through ZigBee coordinator 320. Passing or stationary ZigBee radio tags 400 may selectively communicate with one or more ZigBee routers 340 within the mesh structure. A time stamp may include status information, such as location data for ZigBee radio tag 400, a specific ID associated with the ZigBee radio tag, and/or process related data associated with wafer cassette 500. This status information may thus be communicated in a time stamp from originating from a passing or stationary ZigBee radio tag 400 and passing through wireless network 300 to tracking server 200. In this manner, tracking server 200 may "detect" time related location data for each ZigBee radio tag 400 within the fabrication facility, or some portion of same.

A generic wireless LAN system or an RFID system may be implemented to provide similar capabilities. However, it should be noted that the radio tag components of the wireless LAN communication system must be supplied with an active current of about 200 mA in order to enable communication with proximate network nodes (e.g., routers), and such radio tag components may consume about 10 mA in a standby mode of operation, or an average current of about 50 mA. The RFID communication system must supply an active current of about 50 mA during communications between an RFID coordinator, RFID router and RFID tag, and a standby current of about 50 µA, or an average current of about 10 mA.

In contrast, the ZigBee wireless communication system must supply an active current of about 35 mA during communication between ZigBee coordinator 320, ZigBee router 340 and ZigBee tag 400, and an standby current of about 10 µA, or an average current of about 0.5 mA. ("Average current" in the above example is calculated by assuming a transmission interval of about 30 ms). Since the ZigBee wireless communication system has the average current remarkably lower than those of the generic wireless LAN and RFID communication systems, the ZigBee wireless communication system has a power profile where the life of a power auxiliary device (battery) mounted on ZigBee radio tag 400 ranges from several months to one year. Thus, a management system for semiconductor manufacturing equipment according to one embodiment of the invention may be effectively realized using a wireless network 300 implemented using a ZigBee wireless communication system.

An exemplary configuration implemented using a ZigBee wireless communication system will now be described in some additional detail. Additional implementation details may be commercially obtained from the ZigBee Alliance, a global standardization group.

Figure 3:
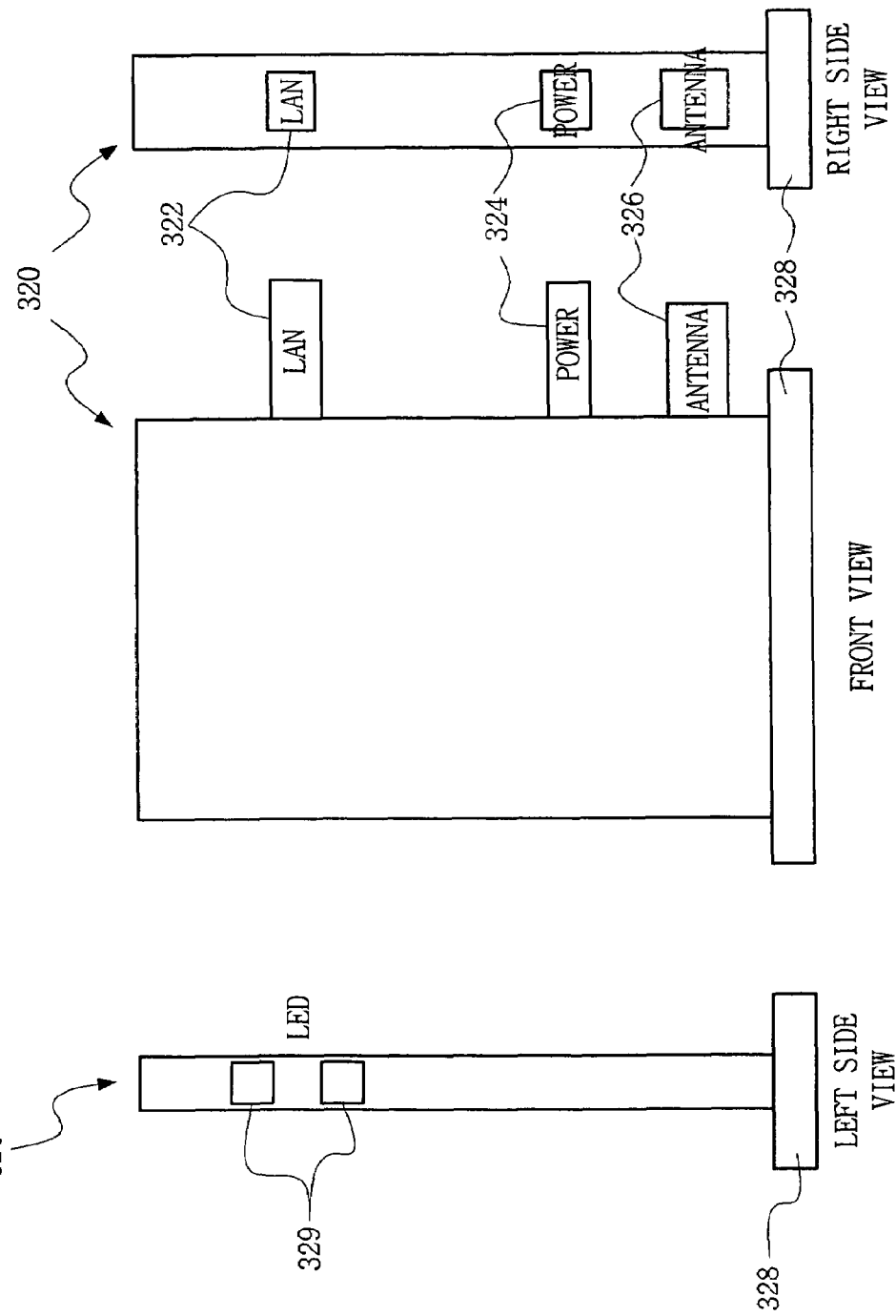
FIG. 3 schematically shows a ZigBee coordinator in a front view, and left and right side views.

FIG. 3 schematically illustrates in one embodiment a ZigBee coordinator 320 in front, left, and right side views. In many configurations of wireless network 300, ZigBee coordinator 320 will be located within the manufacturing facility at a location proximate multiple pieces of semiconductor manufacturing equipment. ZigBee coordinator 320 comprises; a wired LAN 322 connection to tracking server 200, a coordinator antenna 326 wirelessly communicating with at least one ZigBee router 340, and a base 328 adapted to support the device as installed.

ZigBee coordinator 320 operates on externally supplied power connected through a power supply port 324. In one embodiment, coordinator antenna 326 and power supply port 324 are located at the bottom of an equipment bay or gateway housing ZigBee coordinator 320 and are exposed through the equipment bay to allow ready connection access and an unobstructed wireless transmission path. ZigBee coordinator 320 also comprises a plurality of display lamps 329 provided to one side and adapted to visually indicate the operating status of device. In one embodiment, the plurality of display lamps 329 is formed by colored Light Emitting Diodes (LEDs). In one embodiment, ZigBee coordinator 320 may also comprise an auxiliary power supply device (e.g., a battery).

Figure 4:
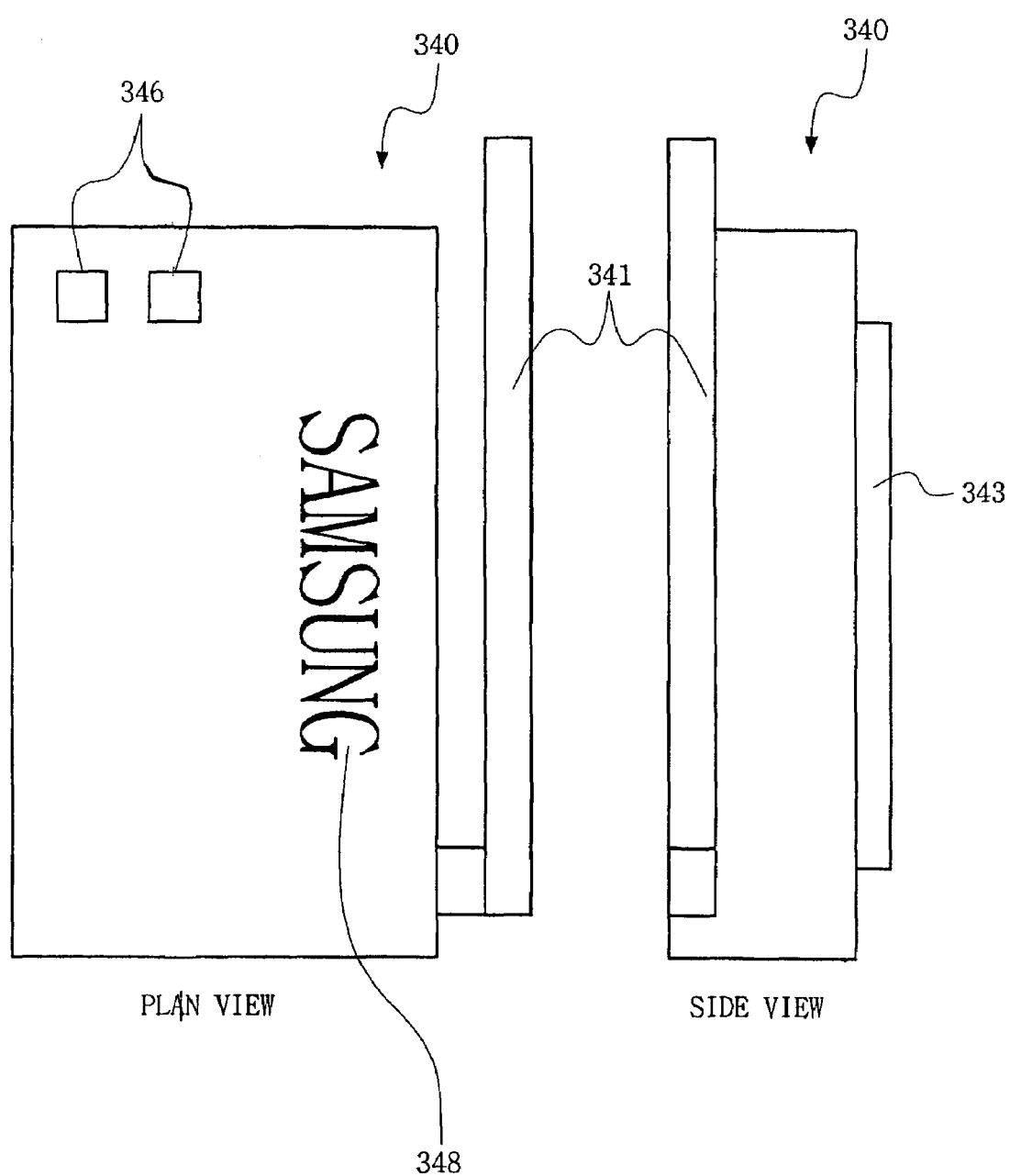
FIG. 4 schematically shows a ZigBee router of FIG. 2 in plan and side views.

FIG. 4 schematically illustrates an exemplary ZigBee router 340 in plain and side views. As noted above, a plurality of ZigBee routers 340 may be easily installed in a desired network structure to extend the communications reach of ZigBee coordinator 320. In one embodiment, each ZigBee router 340 in a network structure is provided with a side-mounted, projected router antenna 341 adapted to facilitate radio signal communications between ZigBee coordinator 320 and/or ZigBee radio tag 400. ZigBee router 340 may be installed on the ground or on a wall at regular intervals around ZigBee coordinator 320.

The actual installation pattern for the plurality of ZigBee routers 340 will be defined in accordance with their transmission and reception characteristics (link capabilities, receiver sensitivity, noise cancellation effects, transmission output power, operating frequency, etc.) as well as the layout of the manufacturing facility (available wall and floor space, access proximity considerations, etc.) in order to enable reliable communication with tracking server 200. In one embodiment, ZigBee router 340 is provided with a base 343 adapted to minimize ground interference. As with the ZigBee coordinator 320, ZigBee router 340 may be provided with a plurality of colored display lamps 346 indicating its operating status. The top of ZigBee router 340 may be provided with a printed logo 348 identifying it within the surrounding environment.

Figure 5:
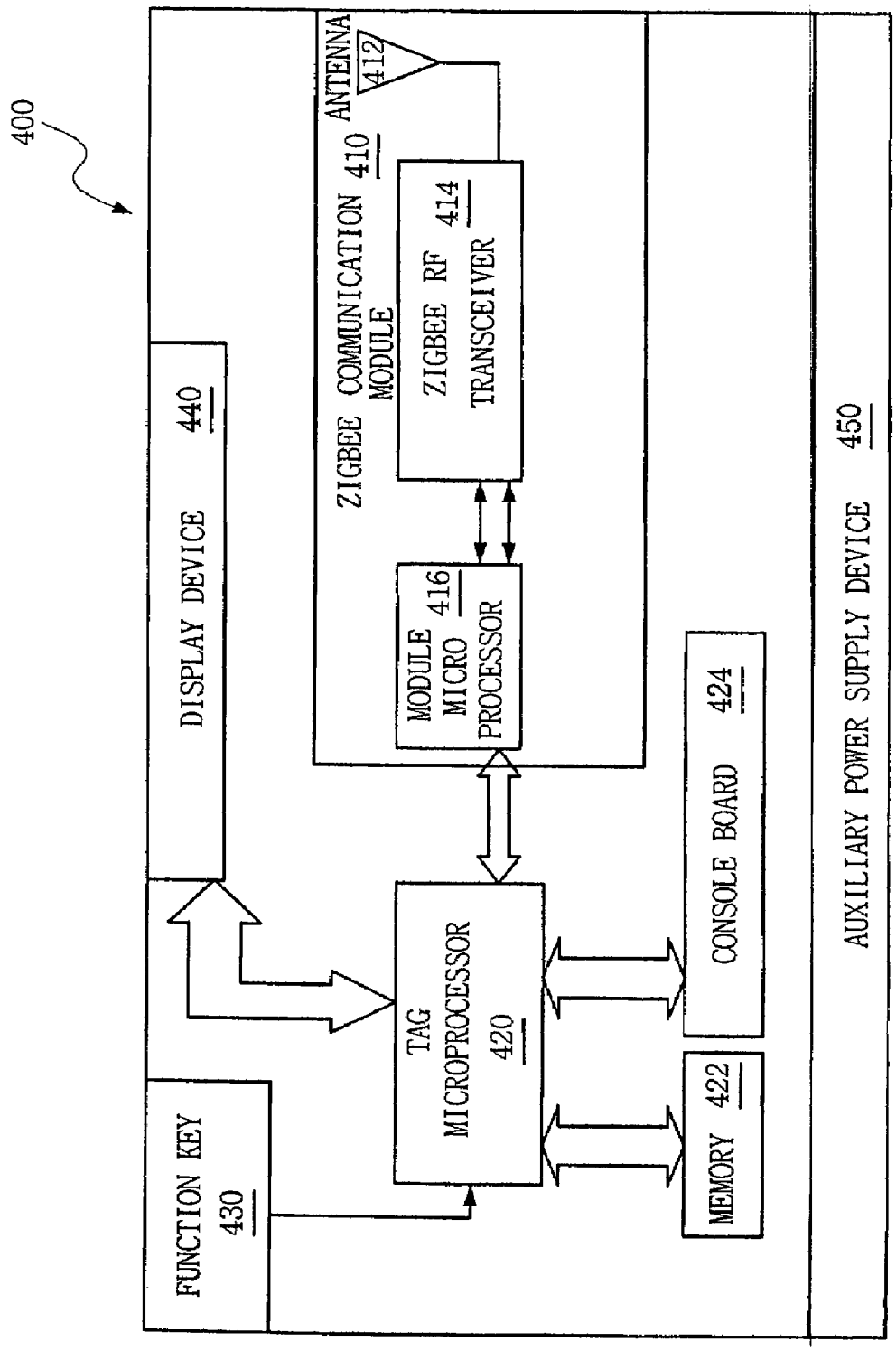
FIG. 5 is a diagram showing a ZigBee radio tag.
Figure 6:
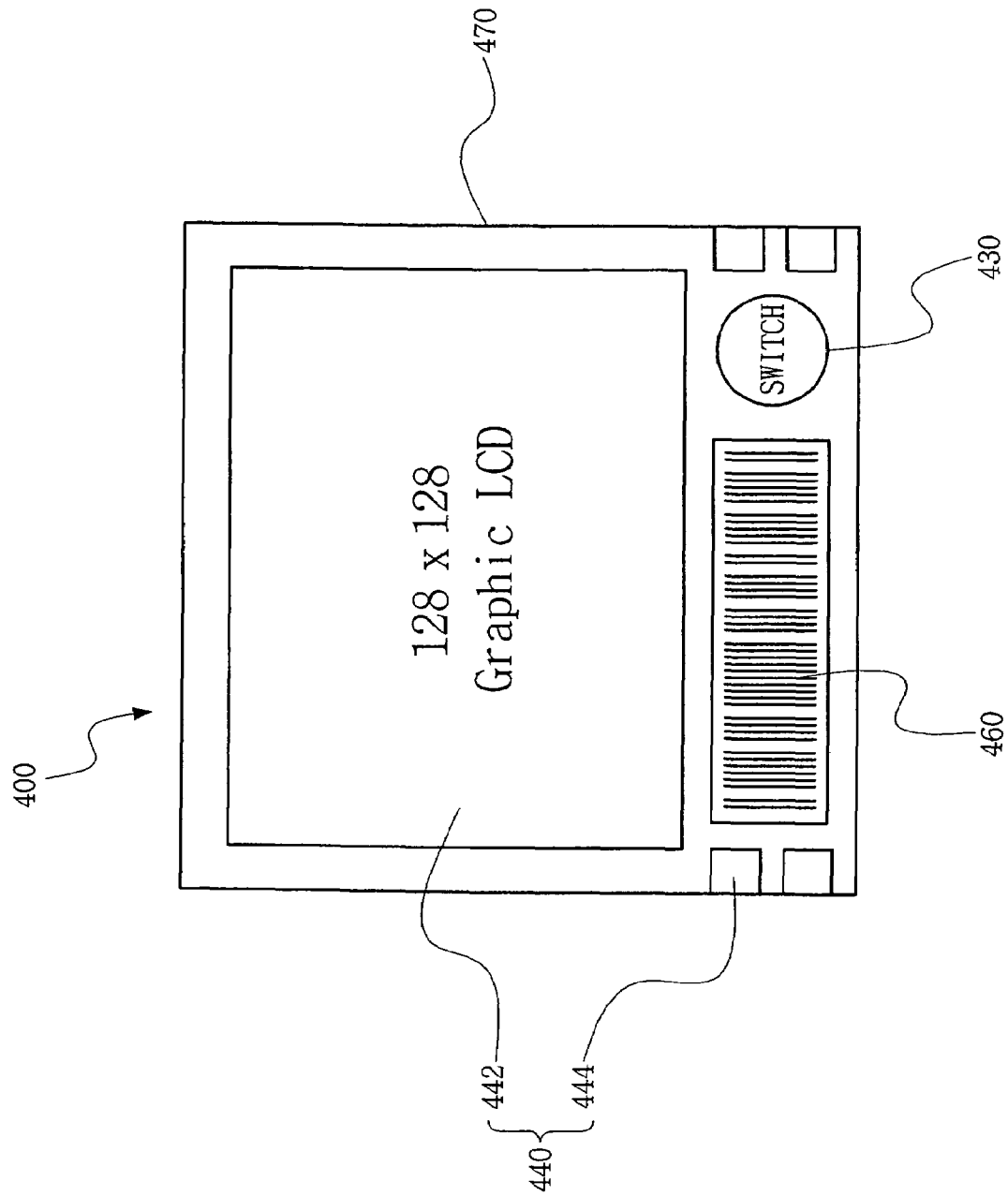
FIG. 6 is a plan view showing a ZigBee radio tag of FIG. 5.

FIG. 5 is a diagram illustrating the construction of an exemplary ZigBee radio tag 400. FIG. 6 is a plan view of ZigBee radio tag 400 shown in FIG. 5.

As shown in FIGS. 5 and 6, ZigBee radio tag 400 comprises a ZigBee communication module 410, including an antenna 412, a ZigBee radio frequency (RF) transceiver 414, and module microprocessor 416. In large part and as is conventionally understood, ZigBee communication module 410 along with tag microprocessor 420 facilitate the transmission and reception of RF signals in ZigBee radio tag 400. Tag microprocessor 420 runs software adapted to facilitate an indication of movement by ZigBee radio tag 400 or its stationary position within the manufacturing facility via wireless network 300. A function key 430 is provided to facilitate the input of certain restricted commands to tag microprocessor 420.

ZigBee radio tag 400 also comprises a display device 440 adapted to display information being input to or output from tag microprocessor 420, and an auxiliary power supply device 450 powering the device.

In the illustrated example, module microprocessor 416 processes received data by recognizing one 8-bit byte of data as a reference. Tag microprocessor 420 is connected to module microprocessor 416 and outputs status information (e.g., ID data) relate to the associated wafer cassette 500 to which ZigBee radio tag 400 is attached. For example, tag microprocessor 420 may output information received from tracking sever 200 (e.g., a poling signal) that corresponds to specific identification of ZigBee radio tag 400. This poling signal may have a transmission period of about 30 ms and will generally allow tracking server 200 to detect any movement of ZigBee radio tag 400 in real time.

Tag microprocessor 420 may be further adapted to output a signal controlling a display of information (e.g., status information, wafer cassette ID information, etc.) on the display device 440 in accordance with the poling signal information provided by module microprocessor 416 and/or the programmed contents of radio tag 400. In one embodiment, tag microprocessor 420 will be programmed to recognize the 8-bit byte of reference data received from module microprocessor 416. Tag microprocessor 420 may be associated with a memory 422 adapted to temporally or permanently store the information corresponding to attached wafer cassette 500, and a console board 424 enabling an external operator to input various control signals (e.g., a turn-on or turn-off signal for display device 440) to tag microprocessor 420. Memory 422 may be further adapted to store programming information, such as a ZigBee communication program. Function key 430 and/or console board 424 may be further adapted to select from a menu of control functions directing the operation of tag microprocessor 420. In one embodiment, function key 430 comprises a power switch and at least one push button used to indicate the status information, etc.

Display device 440 may be adapted to display current and/or historical status information under the control of tag microprocessor 420. As an alternative to being "always on", and thereby consuming constant power from auxiliary power supply device 450, display device 440 may be selectively turned on (e.g., for about 10 seconds) for a predetermined time only when a display request is received. In one embodiment, display device 440 comprises an LCD screen 442, and at least one LED display lamp 444. LCD screen 442 may be formed from a matrix of 128×128 pixel elements presenting a color or black and white image. LCD screen 442 may comprise a built-in controller connected to tag microprocessor 420 through an 8-bit control bus. In one specific embodiment, LCD screen 442 comprises a panel measuring 78 mm (length) by 70 mm (width) by 8.8 mm (thickness).

In various embodiments, auxiliary power supply device 450 will be fairly small in size, light weight, and conveniently portability, yet able to provide sufficient electrical energy. In one embodiment, auxiliary power supply device 450 comprises a re-chargeable lithium polymer battery providing a DC voltage of about 3 V. In one specific physical embodiment, auxiliary power supply device 450 may be externally mounted and has a size of 66 mm (length) by 60 mm (width) by 4.8 mm (thickness). However, provided auxiliary power supply device 450 should allow an extended period of time between re-charge or replacement operations, as well as some indication of weak charge (e.g., as part of the provided status information).

In one embodiment, ZigBee radio tag 400 is constructed in such a way so as to be readily mounted in a housing 470 of predetermined size on wafer cassette 500. For example, the housing may be made from plastic and have a size of 86 mm (length) by 80 mm (width) by 20.5 mm (thickness).

Further, a barcode 460 of predetermined may be formed on the front of housing 470 to thereby enable an operator to directly check the status information (e.g., the wafer cassette identification) as need. For example, in the event that ZigBee communication module 410 or provided auxiliary power supply device 450 fails, the wafer cassette 500 may none the less be easily identified. Barcode 460 may also be used in conjunction with the loading and/or unloading of the wafer cassette.

FIG. 7 is a side sectional view showing wafer cassette 500 on which ZigBee radio tag 400 of FIG. 6 is mounted. ZigBee radio tag 400 is inserted in a cradle 520 formed to one side of wafer cassette 500 to move along with wafer cassette 500 and communicate with wireless network 300.

Cradle 520 should be at least as large as housing 470 to allow ZigBee radio tag 400 to be inserted therein, but protrude somewhat from the side of wafer cassette 500. In one embodiment, cradle 520 is formed of a transparent material, so as to enable an operator to see the information displayed on the display device 440 of ZigBee radio tag 400 inserted therein.

Although not shown, an outer box may be provided so as to surround the outside of wafer cassette 500. In such a case, cradle 520 may be formed on one side of the outer box, and ZigBee radio tag 400 may be inserted in cradle 520.

With ZigBee radio tag 400 mounted on wafer cassette 500, it may be faithfully tracked around the, manufacturing facility by tracking server 200 through wireless network 300 in real time. Further, tracking server 200 may determine an optimal movement path using position information corresponding to wafer cassette 500. For example, movement start/stop times, stationary time periods, delay time periods, as well as arrival and departure times related to a particular piece of manufacturing equipment may be used to schedule and track wafer cassettes. Automatic and manual transfers for wafer cassettes related to various pieces of manufacturing equipment may be real time coordinated in relation to this information. For example, an operator may be immediately dispatched to a problem area in the manufacturing facility upon detecting lag times outside of normal ranges.

Further, detailed actual data may be obtained and archived to facilitate after-the-fact evaluation and analysis of wafer cassette transfer and handling procedures and manufacturing facility layout. All of this allows improvement in overall productivity.

While the invention has been described in the context of several exemplary embodiments, it will be understood that the scope of the invention is not limited to only the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A management system for semiconductor manufacturing equipment in a manufacturing facility, the system comprising:
    a host computer communicating with a tracking server, the tracking server communicating with a wireless network adapted to communicate with a ZigBee wireless communication system compatible radio tag associated with a wafer cassette, wherein the wireless network comprises a ZigBee coordinator connected to the tracking server and a plurality of ZigBee routers wirelessly connected to the ZigBee coordinator and wirelessly communicating with the radio tag;
    wherein the tracking server status information from the radio tag via the wireless network, derives location or movement information for the wafer cassette from the status information, and determines an optimal transfer path for the wafer cassette through the manufacturing facility.

2. The management system of claim 1, wherein the plurality of ZigBee routers are configured in a mesh structure extending from the ZigBee coordinator.

3. The management system of claim 2, wherein each one of the plurality of ZigBee routers comprises a full function router adapted to receive status information from the radio tag and acts as a repeater to realize multiple communication channels between the ZigBee coordinator and the radio tag.

4. The management system of claim 2, wherein the ZigBee coordinator is installed within the manufacturing facility proximate multiple pieces of manufacturing equipment, and comprises;
    a hardwired local area network (LAN) connection to the tracking server; and,
    a coordinator antenna adapted to facilitate wireless communication with the plurality of ZigBee routers.

5. The management system of claim 4, wherein the ZigBee coordinator is installed in a bottom portion of an equipment bay or gateway providing an unobstructed wireless communications path to the plurality of ZigBee routers.

6. The management system of claim 5 wherein the ZigBee coordinator further comprises a plurality of display lamps adapted to indicate an operating status.

7. The management system of claim 1, wherein the radio tag comprises a ZigBee communication module adapted for use within a ZigBee wireless communication system and comprising:
    a tag microprocessor running software adapted to derive the status information in response to a poling signal received from a ZigBee router;
    a function key adapted to provide restricted commands to the tag microprocessor;
    a display device adapted to display information input to or output from the tag microprocessor; and,
    an auxiliary power supply device adapted to power the ZigBee communication module.

8. The management system of claim 7, wherein the ZigBee communication module further comprises:
    an antenna adapted to facilitate the wireless communication of data to and from the plurality of ZigBee routers,
    a ZigBee RF transceiver adapted to demodulate a wireless signal received from the antenna and modulate information onto a wireless signal broadcast from the antenna; and,
    a module microprocessor providing information from the demodulated signal to the tag microprocessor.

9. The management system of claim 7, wherein the tag microprocessor comprises:
    an associated memory adapted to temporally or permanently store status information; and,
    a console board enabling input of control signals by an external operator to the tag microprocessor.

10. The management system of claim 7, wherein the function key comprises at least one push button.

11. The management system of claim 7, wherein the display device is temporarily turned in response to an operator inquiry.

12. The management system of claim 7, wherein the display device comprises a color liquid crystal display comprising a built-in controller connected to the tag microprocessor via an 8-bit control bus.

13. The management system of claim 7, wherein the auxiliary power supply device comprises a re-chargeable lithium polymer battery.

14. The management system of claim 7, wherein the radio tag is mounted in a plastic housing on the wafer cassette.

15. The management system of claim 14, wherein the radio tag comprises an associated barcode located on the plastic housing.

16. The management system according to claim 14, wherein the plastic housing comprises a cradle holding the radio tag.

17. The management system according to claim 16, wherein the cradle holds an inserted radio tag in such a manner as to protrude from the plastic housing.

18. The management system according to claim 16, wherein the cradle is formed of a transparent material.

* * * * *